(12) United States Patent
Wu et al.

(10) Patent No.: US 12,107,232 B2
(45) Date of Patent: Oct. 1, 2024

(54) ELECTRODE ASSEMBLY, BATTERY CELL, BATTERY, AND MANUFACTURING DEVICE AND METHOD FOR ELECTRODE ASSEMBLY

(71) Applicant: CONTEMPORARY AMPEREX TECHNOLOGY (HONG KONG) LIMITED, Hong Kong (CN)

(72) Inventors: Kai Wu, Ningde (CN); Huihui Liu, Ningde (CN); Zhonghong Li, Ningde (CN); Long Wang, Ningde (CN); Tuo Zheng, Ningde (CN); Huan Che, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 460 days.

(21) Appl. No.: 17/564,537

(22) Filed: Dec. 29, 2021

(65) Prior Publication Data

US 2022/0246992 A1     Aug. 4, 2022

Related U.S. Application Data

(63) Continuation of application No. PCT/CN2021/075359, filed on Feb. 4, 2021.

(51) Int. Cl.
*H01M 10/0587*     (2010.01)
*H01M 4/38*     (2006.01)
(Continued)

(52) U.S. Cl.
CPC ......... *H01M 10/0587* (2013.01); *H01M 4/38* (2013.01); *H01M 4/66* (2013.01);
(Continued)

(58) Field of Classification Search
CPC ...... H01M 10/0587; H01M 4/38; H01M 4/66; H01M 10/0583; H01M 10/0585;
(Continued)

(56) References Cited

U.S. PATENT DOCUMENTS 6,800,398 B1 * 10/2004 Furuya ............... H01M 4/0416
                                                  429/234
11,133,508 B2 * 9/2021 Zhou ................... H01M 4/0435
(Continued)

FOREIGN PATENT DOCUMENTS

| CN | 103748732 A | 4/2014 |
|----|-------------|--------|
| CN | 105914339 A | 8/2016 |

(Continued)

OTHER PUBLICATIONS

Extended European Search Report dated Jun. 21, 2022 received in European Patent Application No. EP 21806929.2.
(Continued)

*Primary Examiner* — Abdullah A Riyami
*Assistant Examiner* — Nader J Alhawamdeh
(74) *Attorney, Agent, or Firm* — Scully, Scott, Murphy & Presser, P.C.

(57) ABSTRACT

An embodiment of the present application provide an electrode assembly, a battery cell, a battery, and an electrode assembly manufacturing equipment and method. Among that, the electrode assembly includes a negative electrode plate and a positive electrode plate which form a bending region. The positive electrode plate includes bending portions located in the bending region, the bending portion includes a positive electrode current collecting layer and a positive active substance layer, and at least one side surface of the positive electrode current collecting layer is provided with the positive active substance layer in a thickness direction of the positive electrode plate. At least one positive (Continued)

active substance layer is provided with the barrier layer, at least a part of the barrier layer is intercalated in the positive active substance layer provided with the barrier layer, and coats at least a part of particles in the positive active substance layer.

20 Claims, 10 Drawing Sheets

(51) Int. Cl.
  *H01M 4/66* (2006.01)
  *H01M 10/0583* (2010.01)
  *H01M 10/0585* (2010.01)
  *H01M 50/103* (2021.01)
  *H01M 50/209* (2021.01)

(52) U.S. Cl.
  CPC ... *H01M 10/0583* (2013.01); *H01M 10/0585* (2013.01); *H01M 50/103* (2021.01); *H01M 50/209* (2021.01); *H01M 2220/20* (2013.01)

(58) Field of Classification Search
  CPC ............ H01M 50/103; H01M 50/209; H01M 2220/20; H01M 10/0525; H01M 4/62; Y02E 60/10; Y02P 70/50
  See application file for complete search history.

(56) References Cited

U.S. PATENT DOCUMENTS

| | | | | |
|---|---|---|---|---|
| 2006/0216609 A1* | 9/2006 | Abe | ................. | H01M 10/0587 |
| | | | | 429/234 |
| 2007/0224493 A1* | 9/2007 | Higuchi | ............. | H01M 50/531 |
| | | | | 429/130 |
| 2011/0076557 A1* | 3/2011 | Ishii | ....................... | B60L 50/16 |
| | | | | 429/231.95 |
| 2013/0022865 A1* | 1/2013 | Nishinaka | ............. | H01M 4/667 |
| | | | | 429/211 |
| 2014/0201982 A1 | 7/2014 | Waseda | | |
| 2016/0133934 A1 | 5/2016 | Tode et al. | | |
| 2017/0025646 A1* | 1/2017 | Ota | .................... | H01M 10/049 |
| 2017/0069881 A1* | 3/2017 | Kwon | ................. | H01M 50/129 |
| 2018/0233301 A1* | 8/2018 | Kano | .................... | H01M 50/46 |
| 2018/0358623 A1 | 12/2018 | Tode et al. | | |
| 2019/0393511 A1* | 12/2019 | Zhou | ................. | H01M 10/0431 |
| 2021/0020993 A1 | 1/2021 | Jun | | |

FOREIGN PATENT DOCUMENTS

| | | |
|---|---|---|
| CN | 105958124 A | 9/2016 |
| CN | 205992575 U | 3/2017 |
| CN | 109980230 A | 7/2019 |
| CN | 209418689 U | 9/2019 |
| CN | 111699585 A | 9/2020 |
| CN | 112151874 A | 12/2020 |
| EP | 2306558 A2 | 4/2011 |
| JP | H10326629 A | 12/1998 |
| JP | 2011171107 A | 9/2011 |
| JP | 2013020821 A | 1/2013 |
| JP | 2017147367 A | 8/2017 |
| JP | 2019175653 A | 10/2019 |

OTHER PUBLICATIONS

Notification to Grant Patent Right for Invention dated Sep. 27, 2023 received in Chinese Patent Application No. CN 202280002995.8.

* cited by examiner

ELECTRODE ASSEMBLY, BATTERY CELL, BATTERY, AND MANUFACTURING DEVICE AND METHOD FOR ELECTRODE ASSEMBLY

CROSS-REFERENCE TO RELATED APPLICATIONS

This application is a continuation of International Application No. PCT/CN2021/075359, filed on Feb. 4, 2021, the disclosure of which is hereby incorporated by reference in its entirety.

TECHNICAL FIELD

The present application relates to the technical field of batteries, and in particular, to an electrode assembly, a battery cell, a battery, and a manufacturing device and method for an electrode assembly.

BACKGROUND

Currently, the most commonly used batteries in vehicles are lithium-ion batteries. As a kind of rechargeable battery, lithium-ion batteries have the advantages such as small size, high energy density, high power density, multiple cycles of use, and long storage time.

The rechargeable battery generally includes a housing and an electrode assembly. The housing is used to accommodate the electrode assembly and an electrolytic solution. The electrode assembly generally includes a positive electrode plate and a negative electrode plate, and electric energy is generated by the movement of metal ions, such as lithium ions, between the positive electrode plate and negative electrode plate.

Lithium plating is a common abnormal phenomenon of lithium batteries. Due to abnormalities such as an insufficient space for lithiation in the negative electrode, excessive lithium ion migration resistance, and excessively fast separation of lithium ions from the positive electrode but unable to be intercalated in the negative electrode in the same amount, lithium ions that cannot be intercalated in the negative electrode can only obtain electrons on the surface of the negative electrode, thus forming a phenomenon in which lithium is a simple substance. The lithium plating may affect the charging efficiency and energy density of the lithium ions. When the lithium plating is serious, a lithium crystal may also be formed, and the lithium crystal may pierce a separator and cause internal short-circuit thermal runaway, which seriously endangers the safety of the battery.

Therefore, how to reduce the lithium plating is an urgent technical problem to be solved in the battery technology.

SUMMARY

An embodiment of the present application provide an electrode assembly, a battery cell, a battery, and a manufacturing device and method for the electrode assembly, which may effectively reduce lithium plating.

In a first aspect, an embodiment of the present application provides an electrode assembly, including a negative electrode plate and a positive electrode plate, the negative electrode plate and the positive electrode plate forming a bending region by winding or folding; the positive electrode plate including a plurality of bending portions located in the bending region, the bending portion including a positive electrode current collecting layer and a positive active substance layer, at least one side surface of the positive electrode current collecting layer being provided with the positive active substance layer in a thickness direction of the positive electrode plate; where at least one positive active substance layer is provided with a barrier layer, at least a part of the barrier layer is intercalated in the positive active substance layer provided with the barrier layer, and coats at least a part of particles in the positive active substance layer, to prevent the particles from releasing an ion to the negative electrode plate.

In the above solution, at least a part of the barrier layer is intercalated in the positive active substance layer of the positive electrode plate, and coats at least a part of the particles in the positive active substance layer, thereby preventing the coated particles from releasing the ion to the negative electrode plate, so that at least a part of the active substance in the positive active substance layer loses activity, and loses an ability of releasing the ion. When the negative electrode plate has the fallen-off negative active substance, it may effectively reduce the occurrence of the lithium plating phenomenon, improve the safety of the battery cell, and improve the service life of the battery cell.

In some embodiments, the positive electrode current collecting layer is provided with the positive active substance layer on an inner side in the thickness direction; and the positive active substance layer located on the inner side surface of at least one bending portion is provided with the barrier layer.

In the above solution, the positive active substance layer located on the inner side surface of the positive electrode current collecting layer of at least one bending portion is provided with the barrier layer. The barrier layer may prevent at least a part of particles in the positive active substance layer on the inner side of the positive electrode current collecting layer from releasing the ions to the negative electrode plate, which may reduce the occurrence of the lithium plating phenomenon in a part of the negative electrode plate located in the bending region and located on the inner side of the barrier layer.

In some embodiments, an outer side surface of the positive electrode current collecting layer is provided with the positive active substance layer in the thickness direction; and the positive active substance layer located on the outer side surface of at least one bending portion is provided with the barrier layer.

In the above solution, the positive active substance layer located on the outer side surface of the positive electrode current collecting layer of at least one bending portion is provided with the barrier layer. The barrier layer may prevent at least a part of particles in the positive active substance layer on the outer side of the positive electrode current collecting layer from releasing the ions to the negative electrode plate, which may reduce the occurrence of the lithium plating phenomenon of a part of the negative electrode plate in the bending region and on the outer side of the bending portion provided with the barrier layer.

In some embodiments, the positive electrode current collecting layer is provided with the positive active substance layer on both the inner side and the outer side in the thickness direction, and the positive active substance layer on the inner side and the positive active substance layer on the outer side of at least one bending portion are both provided with the barrier layer.

In the above solution, the positive active substance layer on the inner side surface and the positive active substance layer on the outer side surface of at least one bending portion are both provided with the barrier layers. That is, the positive active substance layer on the inner side and the positive active substance layer on the outer side of the same bending portion are both provided with the barrier layer, which may reduce the occurrence of the lithium plating phenomenon in parts of the negative electrode plate located in the inner side and outer side of the bending portion of the bending region.

In some embodiments, the electrode assembly further includes a separator for separating the positive electrode plate from the negative electrode plate; and the barrier layer is connected to the separator.

In the above solution, the barrier layer is both connected to the separator, and intercalated in the positive active substance layer to connect with the positive electrode plate, which further improves the robustness of the barrier layer and reduces the falling-off risk of the barrier layer.

In some embodiments, the separator is provided with a plurality of through holes; and the barrier layer partially extends into the through hole and is connected to a hole wall of the through hole.

In the above solution, the barrier layer partially extends into the through hole and is connected to the hole wall of the through hole, which may improve the robust connection of the barrier layer and the separator.

In some embodiments, a depth of a part of the barrier layer extending into the through hole is no less than 3 micrometers.

In the above solution, the depth of the part of the barrier layer extending into the through hole is no less than 3 micrometers, so that the part of the barrier layer extending into the through hole has a sufficient depth, to ensure the robust connection of the barrier layer and the separator.

In some embodiments, the barrier layer includes an intercalating portion and a connection portion; the intercalating portion is intercalated in the positive active substance layer provided with the barrier layer, the connection portion is connected to the separator, and the connection portion is located between the separator and the positive active substance layer provided with the barrier layer.

In the above solution, the intercalating portion of the barrier layer is intercalated in the positive active substance layer, which realizes the connection of the barrier layer and the positive electrode plate. The connection portion plays a role of connecting the separator, which realizes the connection of the barrier layer and the separator. In addition, since the connection portion is located between the separator and the positive active substance layer, if there are particles that are not coated by the intercalating portion of the barrier layer in the positive active substance layer, the barrier layer may block the ions released by the uncoated particles from moving to the negative electrode plate, to reduce the occurrence of the lithium plating phenomenon.

In some embodiments, a thickness of the connection portion is no more than 20 micrometers.

In the above solution, the thickness of the connection portion is no more than 20 microns, so that a space occupied by the connection portion may not be too large, making more space for the positive electrode plate and the negative electrode plate, which is beneficial to increase the energy density of the battery cell.

In some embodiments, both ends of the barrier layer extending along a bending direction of the bending portion are located in the bending region.

In the above solution, two ends of the barrier layer extending along the bending direction of the bending portion are both located in the bending region, that is, the entire barrier layer is located in the bending region, which reduces or prevents the influence of the barrier layer on a part of the positive electrode plate located outside the bending region.

In some embodiments, the electrode assembly includes a straight region connected to the bending region; both ends of the barrier layer extending along a bending direction of the bending portion are located in the straight region, or, one end of the barrier layer extending along the bending direction of the bending portion is located in the straight region, and the other end is located in the bending region.

In some embodiments, the positive electrode plate and the negative electrode plate form a winding structure by winding, and the winding structure includes the bending region; an electrode plate of the innermost side of the bending region is the negative electrode plate, and a bending portion of the innermost side of the bending region is provided with the barrier layer.

In the above solution, the bending portion of the innermost side of the bending region is provided with the barrier layer, which may reduce the occurrence of the lithium plating phenomenon in the negative electrode plate.

In some embodiments, the barrier layer is a glue layer.

In the above solution, the barrier layer is the glue layer. When the glue layer is not solidified, the glue layer has a certain fluidity and is convenient to be intercalated in the positive active substance layer to coat at least a part of the particles in the positive active substance layer.

In a second aspect, an embodiment of the present application provides a battery cell, including a shell and the electrode assembly according to any one of the embodiments of the first aspect; the electrode assembly being accommodated in the shell.

In a third aspect, an embodiment of the present application provides a battery, including a box body, and the battery cell according to any one of the embodiments of the above second aspect; the battery cell being accommodated in the box body.

In a fourth aspect, an embodiment of the present application provides a power consumption device, including the battery cell according to any one of the embodiments of the above second aspect.

In a fifth aspect, an embodiment of the present application provides an manufacturing method for an electrode assembly, the manufacturing method including: providing a positive electrode plate, a negative electrode plate, and a barrier layer; winding or folding the positive electrode plate and the negative electrode plate, to form a bending region; where the positive electrode plate includes a plurality of bending portions located in the bending region, the bending portion includes a positive electrode current collecting layer and a positive active substance layer, at least one side surface of the positive electrode current collecting layer is provided with the positive active substance layer in a thickness direction of the positive electrode plate; at least one positive active substance layer is provided with the barrier layer, at least a part of the barrier layer is intercalated in the positive active substance layer provided with the barrier layer, and coats at least a part of particles in the positive active substance layer, to prevent the particles from releasing an ion to the negative electrode plate.

In some embodiments, the manufacturing method further includes: before winding or folding the positive electrode plate and the negative electrode plate, fixing the barrier layer on the positive electrode plate, so that at least a part of the barrier layer is intercalated in the positive active substance layer of the positive electrode plate.

In some embodiments, a separator for separating the positive electrode plate from the negative electrode plate is provided, and the positive electrode plate, the separator and the negative electrode plate are wound or folded, to form the bending region.

In some embodiments, the manufacturing method further includes: heating the barrier layer, making the barrier layer in a viscous state, so that the barrier layer is bonded to the separator and infiltrated into a through hole of the separator.

In a sixth aspect, an embodiment of the present application further provides a manufacturing device for an electrode assembly, including: a first providing apparatus, for providing a positive electrode plate; a second providing apparatus, for providing a negative electrode plate; a third providing apparatus, for providing a barrier layer; and an assembly apparatus, for winding or folding the positive electrode plate and the negative electrode plate, to form a bending region; where the positive electrode plate includes a plurality of bending portions located in the bending region, the bending portion includes a positive electrode current collecting layer and a positive active substance layer, at least one side surface of the positive electrode current collecting layer is provided with the positive active substance layer in a thickness direction of the positive electrode plate; at least one positive active substance layer is provided with the barrier layer, at least a part of the barrier layer is intercalated in the positive active substance layer provided with the barrier layer, and coats at least a part of particles in the positive active substance layer, to prevent the particles from releasing an ion to the negative electrode plate.

BRIEF DESCRIPTION OF DRAWINGS

In order to illustrate the technical solution in the embodiments of the present application more clearly, brief description will be made below to the drawings required in the embodiments of the present application, and apparently, the drawings described below are some embodiments of the present application only, and other drawings could be obtained based on these drawings by those ordinary skilled in this art without creative efforts.

Figure 1:
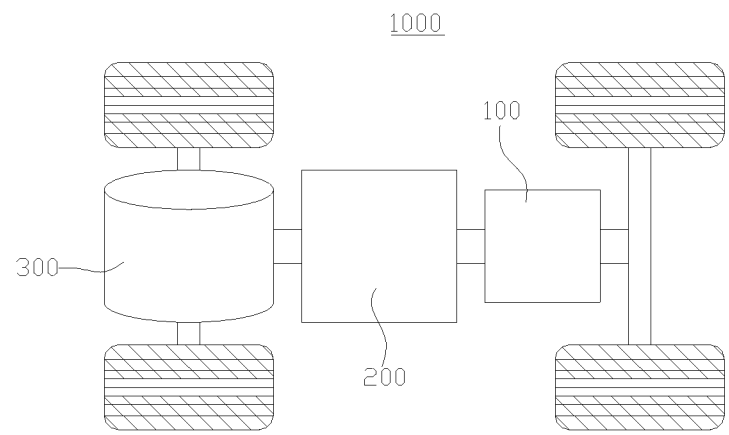
FIG. 1 is a schematic structural diagram of a vehicle provided by some embodiments of the present application.

Marking description: 10—box body; 11—first portion; 12—second portion; 13—accommodating space; 20—battery cell; 21—shell; 211—housing; 212—cover body; 213—sealing space; 22—electrode assembly; 221—negative electrode plate; 2211—negative electrode current collector; 2212—negative active substance member; 222—positive electrode plate; 2220—bending portion; 2220a—positive electrode current collecting layer; 2220b—positive active substance layer; 2220c—inner side surface; 2220d—outer side surface; 2221—positive electrode current collector; 2222—positive active substance member; 223—barrier layer; 2231—intercalating portion; 2232—connection portion; 2233—extension portion; 224—separator; 2241—through hole; 23—positive electrode terminal; 24—negative electrode terminal; 25—pressure relief mechanism; 30—battery module; 31—bus component; 100—battery; 200—controller; 300—motor; 1000—vehicle; 1100—first providing apparatus; 1200—second providing apparatus; 1300—third providing apparatus; 1400—assembly apparatus; 2000—manufacturing device; A—bending region; B—straight region; C—bending direction.

DESCRIPTION OF EMBODIMENTS

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "including" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The phrase "embodiments" referred to in the present application means that the descriptions of specific features, structures, and characteristics in combination with the embodiments are included in at least an embodiment of the present application. The phrase at various locations in the specification does not necessarily refer to the same embodiment, or an independent or alternative embodiment exclusive of another embodiment.

In the description of the present application, it should be noted that unless otherwise explicitly specified and defined, the terms "mounting", "connecting", "connection" and "attaching" should be understood in a broad sense, for example, they may be a fixed connection, a detachable connection, or an integrated connection; may be a direct connection and may also be an indirect connection via an intermediate medium, or may be communication between the interiors of two elements. Those of ordinary skill in the art may appreciate the specific meanings of the foregoing terms in the present application according to specific circumstances.

In the embodiments of the present application, same components are denoted by same reference numerals, and detailed description of the same components is omitted in different embodiments for brevity. It should be understood that dimensions such as thicknesses, lengths and widths of various components in embodiments of the present application shown in the drawings, as well as dimensions of the overall thickness, length and width of an integrated apparatus are merely illustrative, and should not constitute any limitation to the present application.

In the present application, "a plurality of" means two or more (including two).

In the present application, battery cells may include lithium-ion secondary batteries, lithium-ion primary batteries, lithium-sulfur batteries, sodium/lithium-ion batteries, sodium-ion batteries or magnesium-ion batteries, etc., which are not limited by the embodiments of the present application. The battery cells may be cylindrical, flat, cuboid or in another shape, which is not limited by the embodiments of the present application. The battery cells are generally divided into three types according to the way of packaging: cylindrical battery cells, prismatic battery cells and pouch battery cells, which are not limited by the embodiments of the present application.

The battery mentioned in the embodiment of the present application refers to a single physical module that includes one or more battery cells to provide a higher voltage and capacity. For example, the battery mentioned in the present application may include a battery module or a battery pack. The battery generally includes a box body for enclosing one or more battery cells. The box body may prevent liquid or other foreign matters from affecting the charging or discharging of the battery cells.

The battery cells includes an electrode assembly and an electrolytic solution, and the electrode assembly is composed of a positive electrode plate, a negative electrode plate and a separator. The operation of the battery cell mainly relies on the movement of metal ions between the positive electrode plate and the negative electrode plate. The positive electrode plate includes a positive electrode current collector and a positive active substance member. The positive active substance member is coated on a surface of the positive electrode current collector, and the positive electrode current collector not coated with the positive active substance member protrudes from the positive electrode current collector coated with the positive active substance member and is used as a positive electrode tab. Taking a lithium-ion battery as an example, a material of the positive electrode current collector may be aluminum, and the positive active substance may be lithium cobalt oxides, lithium iron phosphate, ternary lithium or lithium manganate, etc. The negative electrode plate includes a negative electrode current collector and a negative active substance member. The negative active substance member is coated on a surface of the negative electrode current collector, and the negative electrode current collector not coated with the negative active substance member protrudes from the negative electrode current collector coated with the negative active substance member and is used as a negative electrode tab. The material of the negative electrode current collector may be copper, and the negative active substance may be carbon or silicon, etc. In order to ensure that no fusing occurs when a large current passes through, there are a plurality of positive electrode tabs which are folded together, and there are a plurality of negative electrode tabs which are folded together. A material of the separator may be polypropylene (PP) or polyethylene (PE), etc. In addition, the electrode assembly may be a winding structure or a stacked structure, and the embodiments of the present application are not limited thereto.

With the development of the battery technology, it is necessary to consider design factors in multiple aspects simultaneously, such as energy density, cycle life, discharge capacity, C-rate and other performance parameters. In addition, safety of the battery should also be considered.

For lithium-ion batteries, during charging, lithium ions are deintercalated from the positive electrode and intercalated in the negative electrode; and during discharge, lithium ions are deintercalated from the negative electrode and intercalated in the positive electrode. When the lithium-ion batteries are charged, lithium plating may happen due to some abnormal phenomena. For example, due to abnormalities such as an insufficient space for lithiation in the negative electrode, excessive lithium ion migration resistance, and excessively fast extraction of lithium ions from the positive electrode but unable to be intercalated in the negative electrode in the same amount, lithium ions that cannot be intercalated in the negative electrode can only be obtained on the surface of the negative electrode, thus forming a phenomenon in which lithium is a simple substance, which is the lithium plating phenomenon.

The inventor found that the electrode assembly is prone to lithium plating phenomenon in its bending region. After further researches, it is found that during the processes of winding or folding the positive electrode plate and the negative electrode plate, a part of the negative electrode plate in the bending region is prone to the occurrence of the phenomenon of powder removal, which causes the negative active substance of the negative electrode plate to fall off, making that a part of the lithium ions deintercalated from the positive electrode plate during charging cannot be intercalated in the negative electrode plate, and the lithium plating phenomenon occurs.

In view of this, an embodiment of the present application provides a technical solution. By providing the barrier layer on the positive active substance layer of the positive electrode plate located in the bending portion in the bending region, at least a part of the barrier layer is intercalated in the positive active substance layer provided with the barrier layer, and coats at least a part of particles in the positive active substance layer, to prevent the particles from releasing an ion to the negative electrode plate, to reduce the occurrence of the lithium plating phenomenon, and to improve the safety and service life of the battery cell.

The technical solution described in the embodiment of the present application is applicable to a battery and a power consumption device using the battery.

The power consumption device may be vehicles, mobile phones, portable devices, notebook computers, ships, spacecraft, electric toys, electric tools, etc. The vehicle may be fuel vehicles, gas vehicles or new energy vehicles; new energy vehicles may be pure electric vehicles, hybrid vehicles or extended range vehicles, etc; the spacecrafts include airplanes, rockets, space shuttles and spaceships, etc.; the electric toys include fixed or mobile electric toys, such as game consoles, electric vehicle toys, electric ship toys and electric airplane toys, etc.; the electric tools include metal cutting power tools, grinding power tools, assembly power tools and railway power tools, such as electric drills, electric grinders, electric wrenches, electric screwdrivers, electric hammers, impact drills, concrete vibrators, and electric planers, etc. The embodiment of the present application does not impose special restrictions on the above power consumption device.

For the convenience of description, the following embodiments take a vehicle as an example of the power consumption device for description.

Please refer to FIG. 1. FIG. 1 is a schematic structural diagram of a vehicle 1000 provided by some embodiments of the present application. A battery 100 is provided inside the vehicle 1000, and the battery 100 may be provided at the bottom, head, or tail of the vehicle 1000. The battery 100 may be used for power supply of the vehicle 1000, for example, the battery 100 may be used as an operating power source of the vehicle 1000.

The vehicle 1000 may further include a controller 200 and a motor 300. The controller 200 is used to control the battery 100 to supply power to the motor 300, for example, for working power requirements during starting, navigating, and driving of the vehicle 1000.

In some embodiments of the present application, the battery 100 may serve not only as an operation power source of the vehicle 1000, but also as a driving power source of the vehicle 1000, replacing or partially replacing fuel or natural gas to provide driving power for the vehicle 1000.

Figure 2:
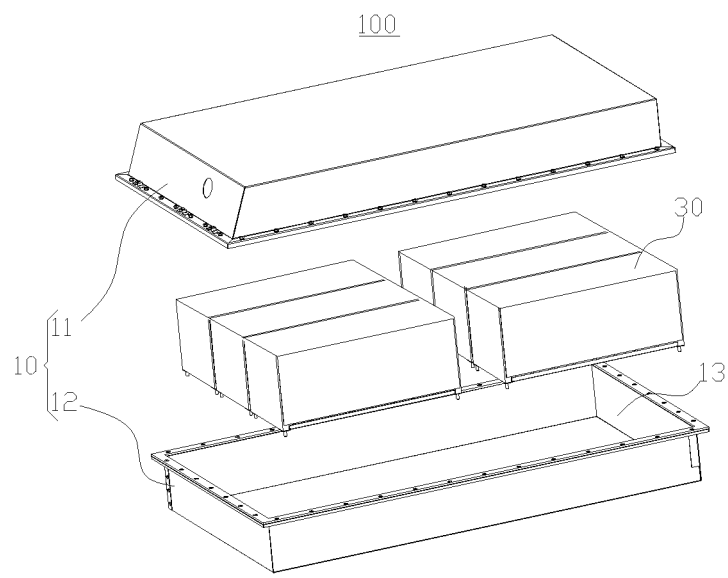
FIG. 2 is an exploded view of a battery provided by some embodiments of the present application.

Please refer to FIG. 2. FIG. 2 is an exploded view of a battery 100 provided by some embodiments of the present application. The battery 100 includes a box body 10 and a battery cell 20 (not shown in FIG. 2), and the battery cell 20 is accommodated in the box body 10.

The box body 10 is used for accommodating the battery cell 20, and the box body 10 may have various structures. In some embodiments, the box body 10 may include a first portion 11 and a second portion 12, the first portion 11 and the second portion 12 are mutually covered, and the first portion 11 and the second portion 12 together define an accommodating space 13 for accommodating the battery cell 20. The second portion 12 may be a hollow structure with one end open, the first portion 11 is a plate-shaped structure, and the first portion 11 covers the opening side of the second portion 12, so that the first portion 11 and the second portion 12 together define the accommodating space 13. The first portion 11 and the second portion 12 may also both be hollow structures with one end open, and the opening side of the first portion 11 covers the opening side of the second portion 12. Of course, the first portion 11 and the second portion 12 may have various shapes, such as a cylinder, a cuboid, etc.

In the battery 100, there may be one or more battery cells 20. If there are a plurality of battery cells 20, the plurality of battery cells 20 may be connected in series or in parallel or in hybrid. The hybrid connection means that the plurality of battery cells 20 are both connected in series and in parallel. The plurality of battery cells 20 may be directly connected in series or in parallel or in hybrid, and then a whole formed by the plurality of battery cells 20 may be accommodated in the box body 10; of course, the plurality of battery cells 20 may also be first connected in series, or in parallel or in hybrid to form a battery module 30; then a plurality of battery modules 30 are connected in series or in parallel or in hybrid to form as a whole, and are accommodated inside the box body 10.

Figure 3:
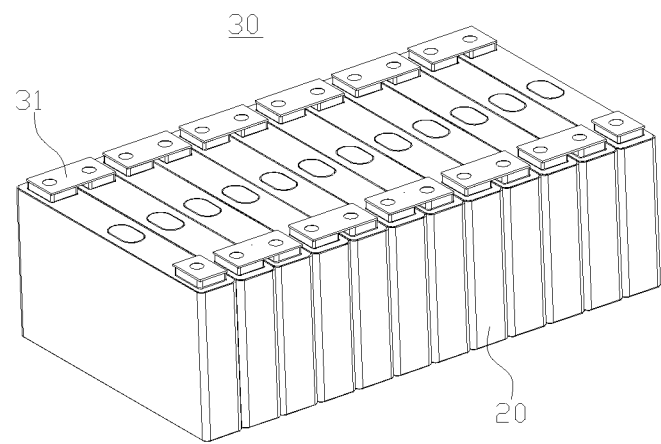
FIG. 3 is a schematic structural diagram of the battery module shown in FIG. 2.

In some embodiments, please refer to FIG. 3. FIG. 3 is a schematic structural diagram of the battery module 30 shown in FIG. 2. A battery 100 includes a plurality of battery modules 30. The battery module 30 includes a plurality of battery cells 20. The plurality of battery cells 20 are first connected in series, or in parallel or in hybrid to form the battery module 30. The plurality of battery modules 30 are then connected in series or in parallel or in hybrid to form as a whole, and are accommodated in the box body 10.

The plurality of battery cells 20 in the battery module 30 may be electrically connected through a bus component 31 to realize the connection of the plurality of battery cells 20 in the battery module 30 in series, or in parallel or in hybrid.

Figure 4:
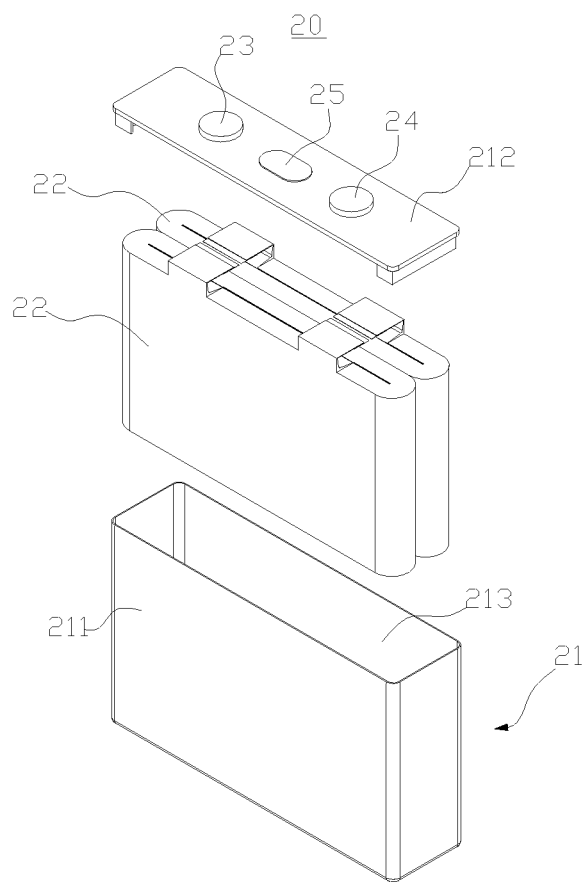
FIG. 4 is an exploded view of the battery cell shown in FIG. 3.

Please refer to FIG. 4. FIG. 4 is an exploded view of the battery cell 20 shown in FIG. 3. The battery cell 20 provided by the embodiment of the present application includes a shell 21 and an electrode assembly 22, and the electrode assembly 22 is accommodated in the shell 21.

In some embodiments, the shell 21 may also be used to accommodate an electrolyte, such as an electrolytic solution. The shell 21 may have various structural forms.

In some embodiments, the shell 21 may include a housing 211 and a cover body 212. The housing 211 is a hollow structure with one side open. The cover body 212 covers the opening of the housing 211 and forms a sealed connection to form a sealing space 213 for accommodating the electrode assembly 22 and the electrolyte.

When the battery cell 20 is assembled, the electrode assembly 22 may be first put in the housing 211, the housing 211 is filled with the electrolyte, and then the cover body 212 covers the opening of the housing 211.

The housing 211 may have various shapes, such as a cylinder, a cuboid, etc. The shape of the housing 211 may be determined according to a specific shape of the electrode assembly 22. For example, if the electrode assembly 22 has a cylindrical structure, a cylindrical housing may be selected; and if the electrode assembly 22 has a cuboid structure, a cuboid housing may be selected. Of course, the cover body 212 may also have various structures, for example, the cover body 212 has a plate-shaped structure, a hollow structure with one end open, etc. Illustratively, in FIG. 4, the housing 211 has a cuboid structure, the cover body 212 has a plate-shaped structure, and the cover body 212 covers the opening of the housing 211.

In some embodiments, the battery cell 20 may further include a positive electrode terminal 23, a negative electrode terminal 24 and a pressure relief mechanism 25. The positive electrode terminal 23, the negative electrode terminal 24 and the pressure relief mechanism 25 are all mounted on the cover body 212. Both the positive electrode terminal 23 and the negative electrode terminal 24 are used for electrical connection with the electrode assembly 22, that is, the positive electrode terminal 23 is used for electrical connection with the positive electrode plate 222, and the negative electrode terminal 24 is used for electrical connection with the negative electrode plate 221. The pressure relief mechanism 25 may be used for relieving an internal pressure of the battery cell 20 when the internal pressure or temperature of the battery cell 20 reaches a predetermined value.

Illustratively, as shown in FIG. 4, the pressure relief mechanism 25 is located between the positive electrode terminal 23 and the negative electrode terminal 24. The pressure relief mechanism 25 may be a component such as an explosion-proof valve, a rupture disk, a gas valve, a pressure relief valve, or a safety valve.

It is understandable that the shell 21 is not only limited to the above structures. The shell 21 may also have other structures. For example, the shell 21 includes a housing 211 and two cover bodies 212. The housing 211 is a hollow structure with openings at two opposite sides. One cover body 212 correspondingly covers one opening of the housing 211 and forms a sealed connection to form a sealing space 213 for accommodating the electrode assembly 22 and the electrolyte. In this structure, the positive electrode terminal 23 and the negative electrode terminal 24 may be installed on the same cover body 212, or on different cover bodies 212; it may be that one cover body 212 is installed with a pressure relief mechanism 25, and it may also be that two cover bodies 212 are both installed with a pressure relief mechanism 25.

It should be noted that in the embodiment of the present application, there may be one or more electrode assemblies 22 accommodated in the shell 21. Illustratively, in FIG. 4, there are two electrode assemblies 22.

Figure 5:
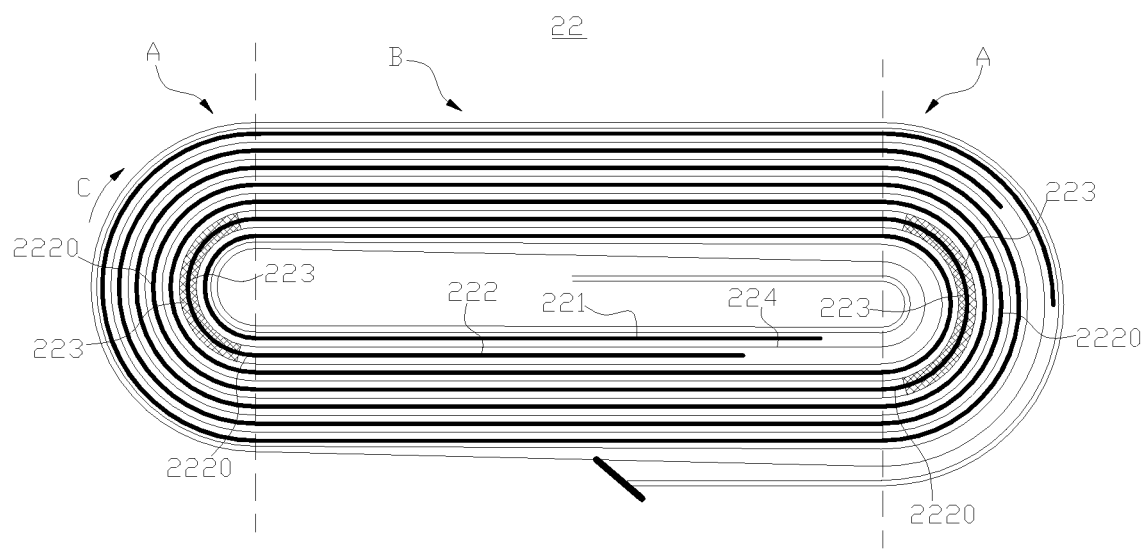
FIG. 5 is a schematic structural diagram of an electrode assembly provided by some embodiments of the present application.
Figure 6:
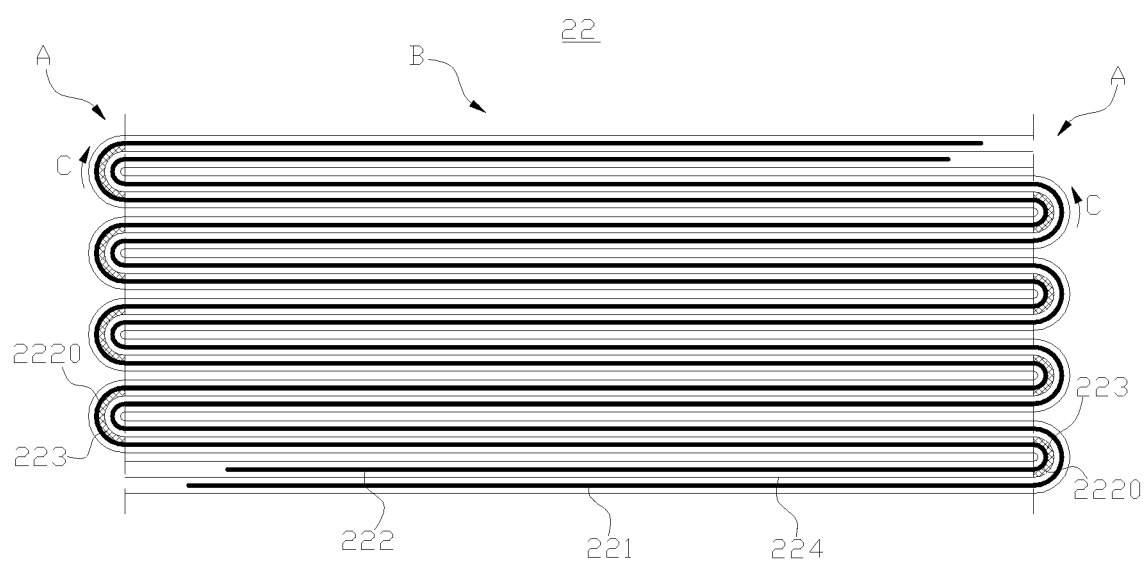
FIG. 6 is a schematic structural diagram of an electrode assembly provided by some other embodiments of the present application.

Please refer to FIG. 5 and FIG. 6. FIG. 5 is a schematic structural diagram of an electrode assembly 22 provided by some embodiments of the present application; and FIG. 6 is a schematic structural diagram of an electrode assembly 22 provided by some other embodiments of the present application. The electrode assembly 22 includes a negative electrode plate 221 and a positive electrode plate 222, and the negative electrode plate 221 and the positive electrode plate 222 form a bending region A by winding or folding.

Among that, the positive electrode plate 222 includes a plurality of bending portions 2220 located in the bending region A, the bending portion 2220 include a positive electrode current collecting layer 2220a (not shown in FIG. 5 and FIG. 6) and a positive active substance layer 2220b (not shown in FIG. 5 and FIG. 6), and at least one side surface of the positive electrode current collecting layer 2220a is provided with the positive active substance layer 2220b in a thickness direction of the positive electrode plate 222. At least one positive active substance layer 2220b is provided with the barrier layer 223. At least a part of the barrier layer 223 is intercalated in the positive active substance layer 2220b provided with the barrier layer 223, and coats at least a part of the particles in the positive active substance layer 2220b, to prevent the particles from releasing the ion to the negative electrode plate 221, so that at least a part of active substance in the positive active substance layer 2220b loses activity, and loses an ability of releasing the ion. When the negative electrode plate 221 has the fallen-off negative active substance, it may effectively reduce the occurrence of the lithium plating phenomenon, improve the safety of the battery cell 20, and improve the service life of the battery cell 20.

In addition, since the barrier layer 223 is intercalated in the positive active substance layer 2220b, which improves the robust connection of the barrier layer 223 and the positive electrode plate 222, and reduces the falling-off risk of the barrier layer 223.

It should be noted that the part of the barrier layer 223 intercalated in the positive active substance layer 2220b partially coats at least a part of the particles in the positive active substance layer 2220b. The coating referred to here may be a full coating or a partial coating. In other words, the particles may be completely covered in the barrier layer 223, or only a part may be covered in the barrier layer 223, as long as the particles may be prevented from releasing the ions.

Illustratively, the ions released by the particles in the positive active substance layer 2220b are lithium ions, that is, the barrier layer 223 plays a role of preventing the particles from releasing the lithium ions.

As shown in FIG. 5, the positive electrode plate 222 and the negative electrode plate 221 may be first stacked and then wound to form a winding structure including the bending region A, for example, a flat winding structure. As shown in FIG. 6, the positive electrode plate 222 and the negative electrode plate 221 may be first stacked and then bent to form a folding structure including the bending region A, for example, the positive electrode plate 222 and the negative electrode plate 221 are stacked and then continuously folded in an S shape, to form a folding structure.

In some embodiments, the electrode assembly 22 may further include a separator 224, the separator 224 used to separate the positive electrode plate 222 from the negative electrode plate 221, so as to reduce the risk of a short circuit between the positive electrode plate 222 and the negative electrode plate 221.

A material of the separator 224 may be polypropylene (PP) or polyethylene (PE), etc.

If the electrode assembly 22 has a winding structure, the positive electrode plate 222, the separator 224, the negative electrode plate 221, and the separator 224 may be stacked in this order successively, and then the four are wound to form the winding structure; and if the electrode assembly 22 has a folding structure, the separator 224, the positive electrode plate 222, the separator 224, the negative electrode plate 221 and the separator 224 may be stacked in this order successively, and then the five are folded to form the folding structure.

Regardless of whether the electrode assembly 22 has the winding structure or the folding structure, the electrode assembly 22 may also include a straight region B. The straight region B is connected to the bending region A, and may be provided with a bending region A at both ends opposite to the straight region B. The straight region B is a region that the electrode assembly 22 has a straight structure. A part where the positive electrode plate 222 is located in the straight region B and a part that the negative electrode plate 221 is located in the straight region B are both arranged substantially straight. In an extension direction of the part where the positive electrode plate 222 is located in the straight region B, two bending regions A are located in two ends of the straight region B. The bending region A is a region that the winding structure has a bending structure. A part where the positive electrode plate 222 is located in the bending region A (the bending portion 2220) and a part that the negative electrode plate 221 is located in the bending region A are both distributed in a bending manner. Illustratively, the part where the positive electrode plate 222 is located in the bending region A (the bending portion 2220) and the part that the negative electrode plate 221 is located in the bending region A are both arc-shaped.

In other embodiments, the winding structure formed by winding the positive electrode plate 222 and the negative electrode plate 221 may also be a cylindrical winding structure. In the electrode assembly 22 of this structure, there is only the bending region A and no straight region B.

A ring of the electrode plate of the positive electrode plate 222 is the bending portion 2220.

In some embodiments, as shown in FIG. 5 and FIG. 6, two ends of the barrier layer 223 extending along the bending direction C of the bending portion 2220 are both located in the bending region A, that is, the entire barrier layer 223 is located in the bending region A, which reduces or prevents the influence of the barrier layer 223 on a part of the positive electrode plate 222 located outside the bending region A.

It should be noted that if one end or two ends of the barrier layer 223 are just located at the junction of the straight region B and the bending region A, the barrier layer 223 is also regarded as being located in the bending region A. The bending direction C of the bending portion 2220 is a circumferential direction of the arc where the bending portion 2220 is located, and may also be regarded as an extending direction of the bending portion 2220. Illustratively, as shown in FIG. 6, two ends of the barrier layer 223 extending along the bending direction C of the bending portion 2220 are both located at the junction of the bending region A and the straight region B.

In some other embodiments, two ends of the barrier layer 223 extending along the bending direction C of the bending portion 2220 are both located in the straight region B. In some other embodiments, one end of the barrier layer 223 extending along the bending direction C of the bending portion 2220 is located in the straight region B, and the other end is located in the bending region A.

Figure 7:
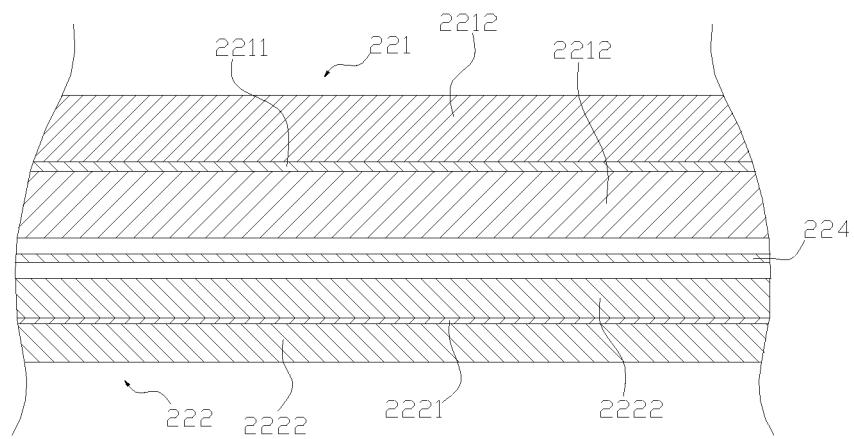
FIG. 7 is a partially enlarged view of a part of an electrode assembly provided by some embodiments of the present application.

In some embodiments, please refer to FIG. 7. FIG. 7 is a partially enlarged view of a part of an electrode assembly 22 provided by some embodiments of the present application. The positive electrode plate 222 includes a positive electrode current collector 2221 and positive active substance members 2222 provided on both sides in a thickness direction of the positive electrode current collector 2221. The positive electrode current collector 2221 may have a part not coated with the positive active substance member 2222, and this part may be used as a positive electrode tab for electrical connection with the positive electrode terminal 23 (refer to FIG. 4). The negative electrode plate 221 includes a negative electrode current collector 2211 and negative active substance members 2212 provided on both sides in a thickness direction of the negative electrode current collector 2211. The negative electrode current collector 2211 may have a part not coated with the negative active substance member 2212, and this part may be used as a negative electrode tab for electrical connection with the negative electrode terminal 24 (refer to FIG. 4).

It is understandable that the positive electrode current collecting layer 2220a of the bending portion 2220 is a part where the positive electrode current collector 2221 is located in the bending region A, and the positive active substance layer 2220b of the bending portion 2220 is a part where the positive active substance member 2222 is located in the bending region A.

In the embodiment of the present application, in the bending portion 2220, the inner side surface 2220c of the positive electrode current collecting layer 2220a may be provided with the positive active substance layer 2220b, the outer side surface 2220d of the positive electrode current collecting layer 2220a may also be provided with the positive active substance layer 2220b, and both the outer side surface 2220d and the inner side surface 2220c of the positive electrode current collecting layer 2220a may also be provided with the positive active substance layers 2220b. In the electrode assembly 22, there is one positive active substance layer 2220b provided with a barrier layer 223, which may effectively reduce the occurrence of the lithium plating phenomenon. It is understandable that the inner side surface 2220c of the positive electrode current collecting layer 2220a is located on the inner side of the outer side surface 2220d. Taking the winding structure including the straight region B and the bending region A as an example, the inner side surface 2220c of the positive electrode current collecting layer 2220a is closer to the straight region B than the outer side surface 2220d.

For convenience of description, the following embodiments take the electrode assembly 22 as an example of a winding structure, and describe the arrangement of the barrier layer 223 in detail.

Figure 8:
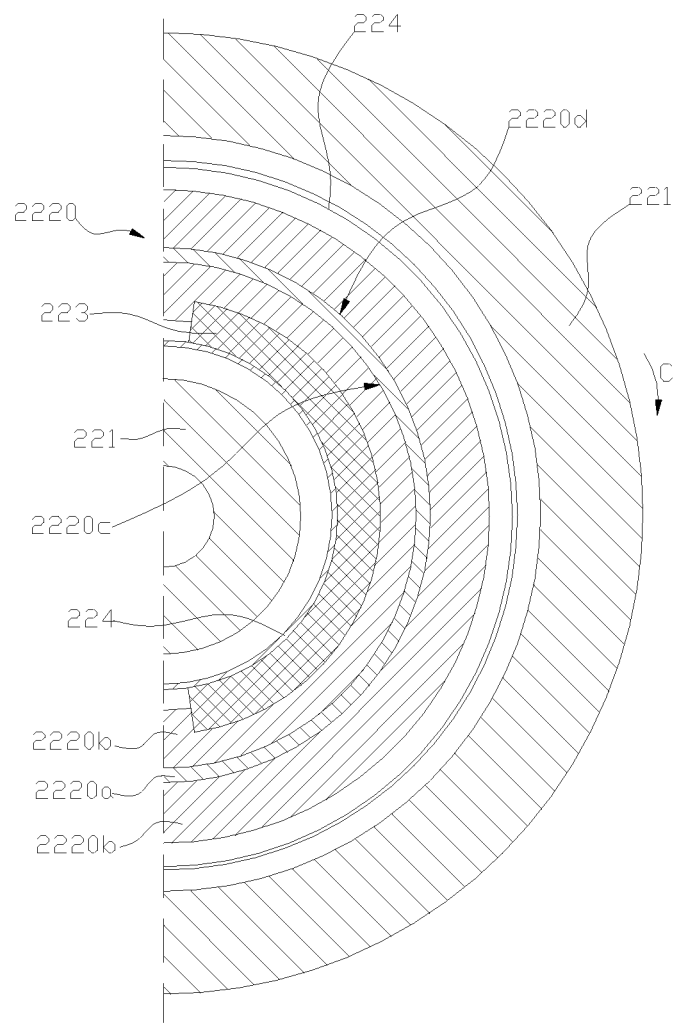
FIG. 8 is a partial view of a part of an electrode assembly located in a bending region provided by some embodiments of the present application.

In some embodiments, please refer to FIG. 8. FIG. 8 is a partial view of a part of an electrode assembly 22 located in a bending region A provided by some embodiments of the present application. The positive electrode current collecting layer 2220a is provided with the positive active substance layer 2220b on the inner side surface 2220c in the thickness direction of the positive electrode plate 222, and the positive active substance layer 2220b on the inner side surface 2220c of the positive electrode current collecting layer 2220a located in at least one bending portion 2220 is provided with the barrier layer 223. The barrier layer 223 may prevent at least a part of particles in the positive active substance layer 2220b on the inner side surface 2220c of the positive electrode current collecting layer 2220a from releasing the ions to the negative electrode plate 221, which may reduce the occurrence of the lithium plating phenomenon in a part of the negative electrode plate 221 located in the bending region A and located in the inner side of the barrier layer 223.

The thickness direction of the positive electrode plate 222 is also the thickness direction of the positive electrode current collecting layer 2220a.

In the present embodiment, the outer side surface 2220d of the positive electrode current collecting layer 2220a may be provided with the positive active substance layer 2220b, or may not be provided with the positive active substance layer 2220b. In FIG. 8, it illustratively shows that both the outer side surface 2220d and the inner side surface 2220c of the positive electrode current collecting layer 2220a are provided with positive active substance layers 2220b.

Figure 9:
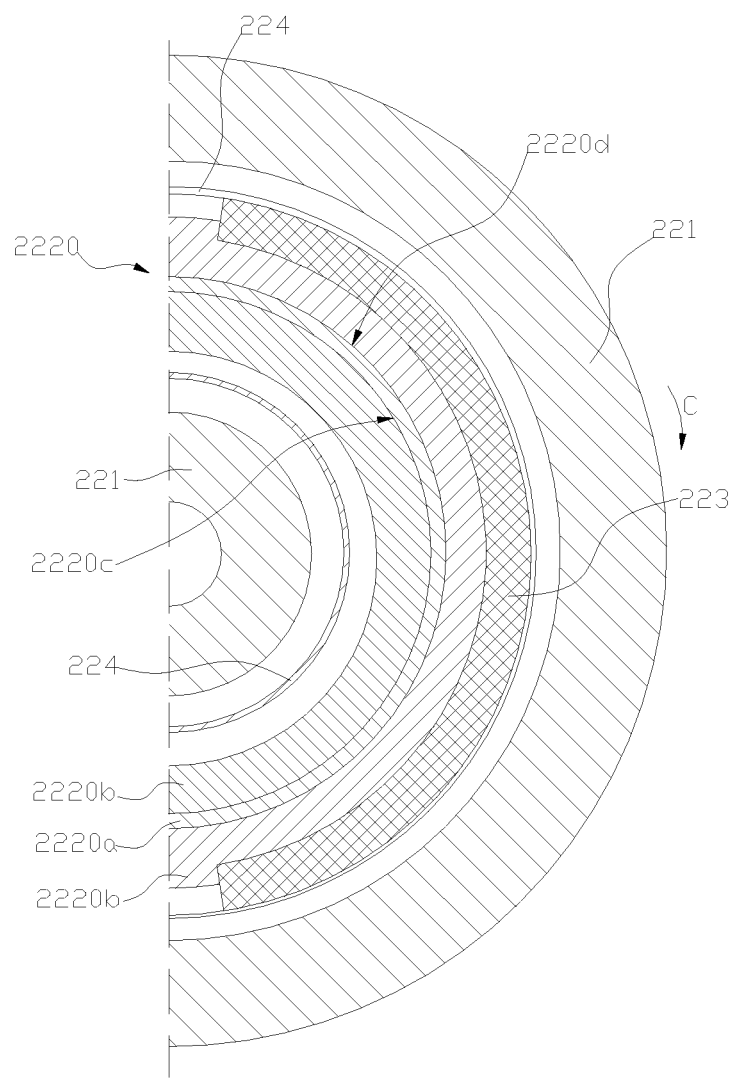
FIG. 9 is a partial view of a part of an electrode assembly located in a bending region provided by some other embodiments of the present application.

In some embodiments, please refer to FIG. 9. FIG. 9 is a partial view of a part of an electrode assembly 22 located in a bending region A provided by some other embodiments of the present application. The positive electrode current collecting layer 2220a is provided with the positive active substance layer 2220b on the outer side surface 2220d in the thickness direction of the positive electrode plate 222, and the positive active substance layer 2220b on the outer side surface 2220d of the positive electrode current collecting layer 2220a located in at least one bending portion 2220 is provided with the barrier layer 223. The barrier layer 223 may prevent at least a part of particles in the positive active substance layer 2220b on the outer side surface 2220d of the positive electrode current collecting layer 2220a from releasing the ions to the negative electrode plate 221, which may reduce the occurrence of the lithium plating phenomenon in a part of the negative electrode plate 221 located in the bending region A and located in the outer side of the barrier layer 223.

In the present embodiment, the inner side surface 2220c of the positive electrode current collecting layer 2220a may be provided with the positive active substance layer 2220b, or may not be provided with the positive active substance layer 2220b. In FIG. 9, it illustratively shows that both the outer side surface 2220d and the inner side surface 2220c of the positive electrode current collecting layer 2220a are provided with positive active substance layers 2220b.

Figure 10:
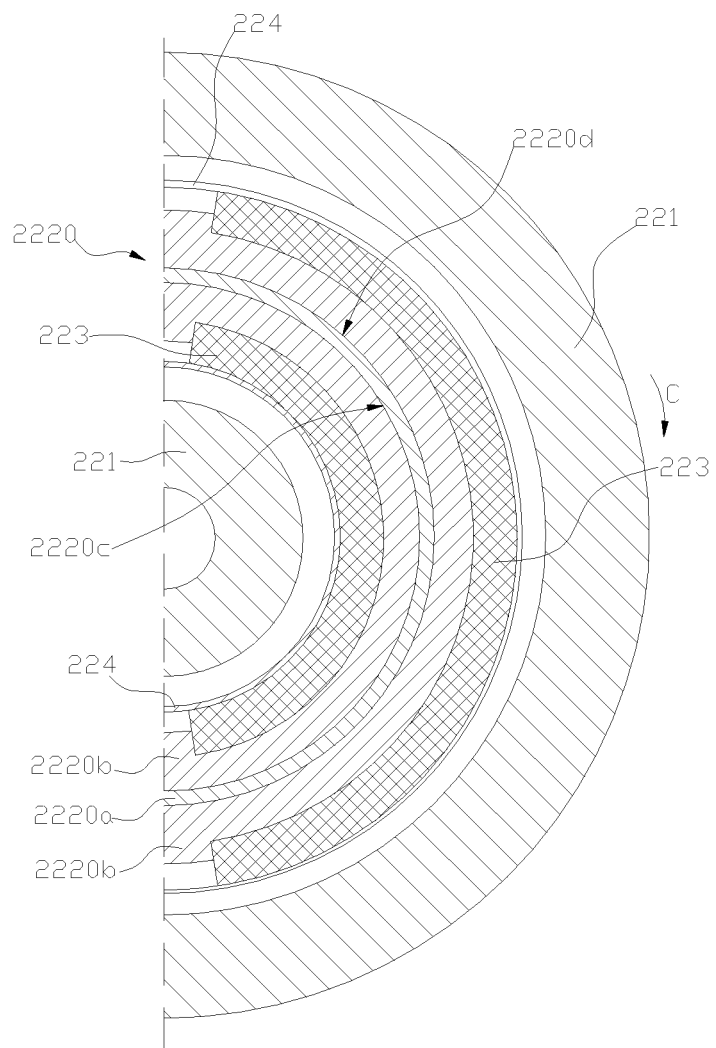
FIG. 10 is a partial view of a part of an electrode assembly located in a bending region provided by some other embodiments of the present application.

In some embodiments, please refer to FIG. 10. FIG. 10 is a partial view of a part of an electrode assembly 22 located in a bending region A provided by some other embodiments of the present application. Both an outer side surface 2220d and an inner side surface 2220c of the positive electrode current collecting layer 2220a are provided with the positive active substance layer 2220b. Moreover, in the case where the positive active substance layer 2220b located on the outer side surface 2220d of the positive electrode current collecting layer 2220a of at least one bending portion 2220 is provided with a barrier layer 223, the positive active substance layer 2220b located on the inner side surface 2220c of the positive electrode current collecting layer 2220a of at least bending portion 2220 may also be provided with the barrier layer 223. Of course, the positive active substance layer 2220b on the outer side surface 2220d of one positive electrode current collecting layer 2220a may be provided with the barrier layer 223, and the positive active substance layer 2220b on the inner side surface 2220c of another positive active substance layer 2220b may also be provided with the barrier layer 223; and the positive active substance layer on the inner side surface 2220c and the positive active substance layer 2220b on the outer side surface 2220d of the positive electrode current collecting layer 2220a may also be both provided with the barrier layers 223. That is, the positive active substance layer 2220b of the inner side and the positive active substance layer 2220b of the outer side of at least one bending portion 2220 are both provided with the barrier layer 223. This structure may reduce the occurrence of the lithium plating phenomenon in parts of the negative electrode plate 221 located in the inner side and the outer side of the bending portion 2220 of the bending region A. In FIG. 10, it is illustratively shown that the positive active substance layer 2220b of the inner side and positive active substance layer 2220b of the outer side in at least one bending portion 2220 are both provided with the barrier layer 223.

In the embodiment of the present application, all bending portions 2220 located in the bending region A may be provided with barrier layers 223, or a part of bending portions 2220 located in the bending region A may be provided with a barrier layer 223. For example, one, two or three bending portions 2220 located in the innermost side of the bending region A are provided with barrier layers 223.

Figure 11:
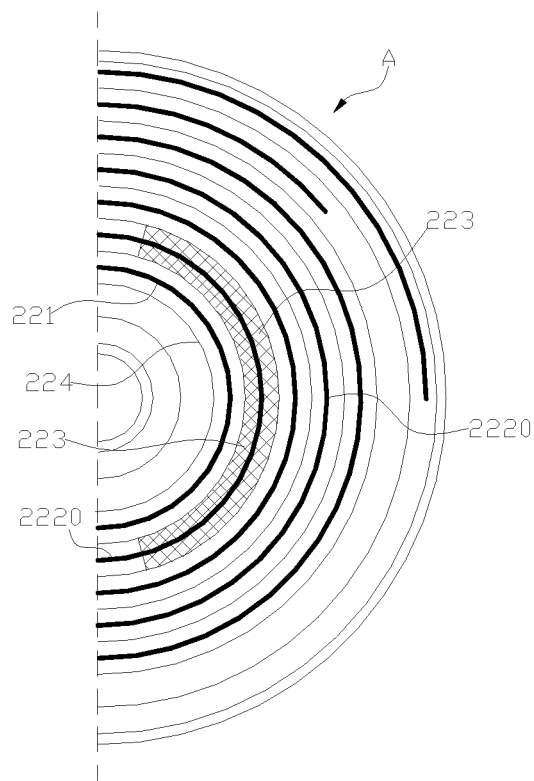
FIG. 11 is a partial view of the electrode assembly shown in FIG. 5.

In some embodiments, please refer to FIG. 11. FIG. 11 is a partial view of the electrode assembly 22 shown in FIG. 5. Taking the positive electrode plate 222 and the negative electrode plate 221 forming a winding structure including a bending region by winding as an example, the electrode plate of the innermost side of the bending region A is the negative electrode plate 221, and the bending portion 2220 of the innermost side of the bending region A is provided with a barrier layer 223.

Since the electrode plate of the innermost side of the bending region A is the negative electrode plate 221, a radius of a part of the negative electrode plate 221 located in innermost rings of the bending region A is small, and it is likely to occur the phenomenon of powder removal. Thus, the bending portion 2220 of the innermost side of the bending region A is provided with the barrier layer 223, which may effectively reduce lithium plating.

Of course, the positive active substance layer 2220b on the inner side surface 2220c of the positive electrode current collecting layer 2220a of the bending portion 2220 of the innermost side of the bending region A may be provided with the barrier layer 223; and the positive active substance layer 2220b on the outer side surface 2220d of the positive electrode current collecting layer 2220a of the bending portion 2220 of the innermost side of the bending region A may also be provided with the barrier layer 223. As shown in FIG. 11, the positive active substance layer 2220b on the outer side surface 2220d and the positive active substance layer 2220b on the inner side surface 2220c of the positive electrode current collecting layer 2220a (not shown in FIG. 11) of the bending portion 2220 of the innermost side of the bending region A may also be provided with barrier layer 223.

In some embodiments, as shown in FIG. 8-FIG. 10, when the positive electrode plate 222 and the negative electrode plate 221 are separated by the separator 224, the barrier layer 223 may be connected together to the separator 224, that is, the barrier layer 223 is both connected to the separator 224, and intercalated in the positive active substance layer 2220b to be connected to the positive electrode plate 222, which further improves the robustness of the barrier layer 223 and reduces the falling-off risk of the barrier layer 223.

In other embodiments, the barrier layer 223 may only be in contact with the separator 224, but the barrier layer 223 and the separator 224 are independent of each other and are not connected together. Of course, the barrier layer 223 may also be completely intercalated in the positive active substance layer 2220b, so that the barrier layer 223 and the separator 224 are not in contact, causing a distance between the two.

Figure 12:
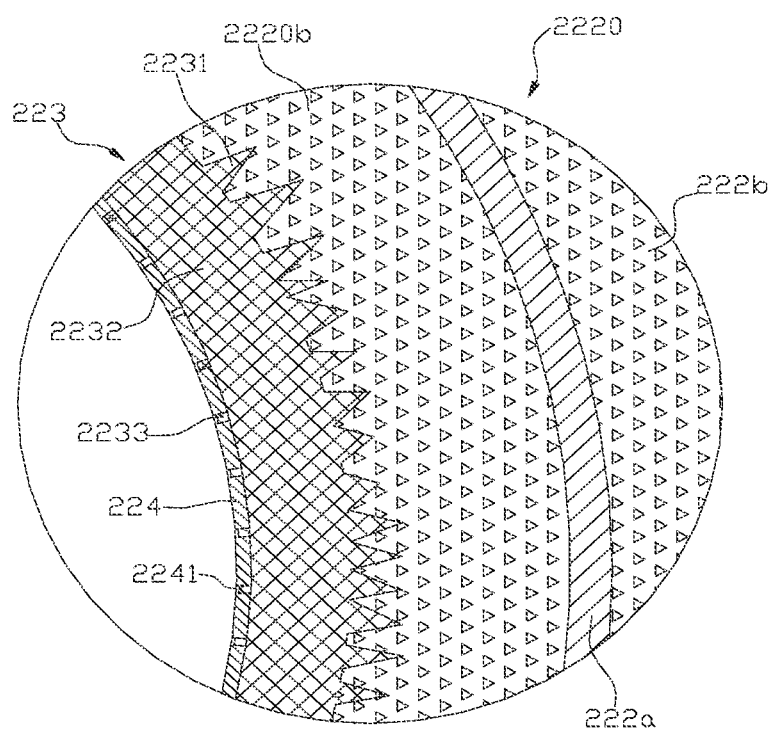
FIG. 12 is a schematic view of connection of a bending portion, a barrier layer and a separator provided by some embodiments of the present application.

In some embodiments, please refer to FIG. 12. FIG. 12 is a schematic view of connection of a bending portion 2220, a barrier layer 223 and a separator 224 provided by some embodiments of the present application. The barrier layer 223 includes an intercalating portion 2231 and a connection portion 2232; the intercalating portion 2231 is intercalated to the positive active substance layer 2220b provided with the barrier layer 223, and the connection portion 2232 is connected to the separator 224, and is located between the separator 224 and the positive active substance layer 2220b provided with the barrier layer 223.

The intercalating portion 2231 of the barrier layer 223 is intercalated in the positive active substance layer 2220b, which realizes the connection of the barrier layer 223 and the positive electrode plate 222. The connection portion 2232 plays a role of connecting to the separator 224, which realizes the connection of the barrier layer 223 and the separator 224. In addition, since the connection portion 2232 is located between the separator 224 and the positive active substance layer 2220b, if there are particles that are not coated by the intercalating portion 2231 of the barrier layer 223 in the positive active substance layer 2220b, the barrier layer 223 may block the ions released by the uncoated particles from moving to the negative electrode plate 221, to reduce the occurrence of the lithium plating phenomenon.

A part of the barrier layer 223 located between the positive active substance layer 2220b and the separator 224 is the connection portion 2232. Illustratively, a thickness of the connection portion 2232 is no more than 20 microns, so that a space occupied by the connection portion 2232 may not be too large, making more space for the positive electrode plate 222 and the negative electrode plate 221, which is beneficial to increase the energy density of the battery cell 20.

In some embodiments, please continue to refer to FIG. 12. The separator 224 is provided with a plurality of through holes 2241. The barrier layer 223 partially extends into the through hole 2241 and is connected together to the hole wall of the through hole 2241, to improve the robust connection of the barrier layer 223 and the separator 224.

For the electrode assembly 22, during the charging process, ions (such as lithium ions) deintercalated from the positive electrode plate 222 will pass through the electrolyte and be intercalated in the negative electrode plate 221 through a pore on the separator 224. Illustratively, the through hole 2241 on the separator 224 is the pore for ions to pass through.

In the present embodiment, the barrier layer 223 further includes an extension portion 2233, the extension portion 2233 is connected to the connection portion 2232, and the extension portion 2233 extends into the through hole 2241.

Illustratively, a depth of the part of the barrier layer 223 extending into the through hole 2241 is no less than 3 micrometers, so that the part of the barrier layer 223 extending into the through hole 2241 has a sufficient depth, to ensure the robust connection of the barrier layer 223 and the separator 224. A part of the barrier layer 223 extending into the through hole 2241 is the extension portion 2233, that is, an extension depth of the extension portion 2233 extending into the through hole 2241 is no less than 3 microns.

It may be seen from the above embodiments that the barrier layer 223 may be both connected to the positive active substance layer 2220b of the positive electrode plate 222, and may also be connected to the separator 224. The barrier layer 223 may play a role of connecting the separator 224 with the positive electrode plate 222. The barrier layer 223 may have various structures.

In some embodiments, the barrier layer 223 may be a glue layer. When the glue layer is not solidified, the glue layer has a certain fluidity and is convenient to intercalate the barrier layer 223 in the positive active substance layer 2220b to coat at least a part of the particles in the positive active substance layer 2220b, and is also convenient for the barrier layer 223 to extend to the through hole 2241 of the separator 224. After the glue layer is solidified, the glue layer may be bonded to the separator 224 and the positive active substance layer 2220b, so as to realize connections of the barrier layer 223 and the positive active substance layer 2220b, and the barrier layer 223 and the separator film 224.

The glue layer may be a hot melt adhesive, a photosensitive adhesive, an instant adhesive, a one-component epoxy adhesive, a one-component silicone, a one-component polyurethane, a two-component epoxy, a two-component silicone or a two-component polyurethane glue, etc.

In the process of manufacturing the electrode assembly 22, the glue layer may be first coated on the positive active substance layer 2220b of the positive electrode plate 222, so that the glue layer penetrates into the positive active substance layer 2220b; and then a part of the glue layer penetrating into the positive active substance layer 2220b coats at least a part of particles in the positive active substance layer 2220b, to prevent the particles from releasing ions. After the glue layer is solidified, the positive electrode plate 222 and the separator 224 are stacked together, the glue layer is then heated, making the glue layer in a viscous state, so that the barrier layer 223 is bonded to the separator 224 and penetrates in the through hole 2241 of the separator 224; and finally, the negative electrode plate 221, the positive electrode plate 222 and the separator 224 are stacked together, to form the electrode assembly 22 by winding or folding.

Figure 13:
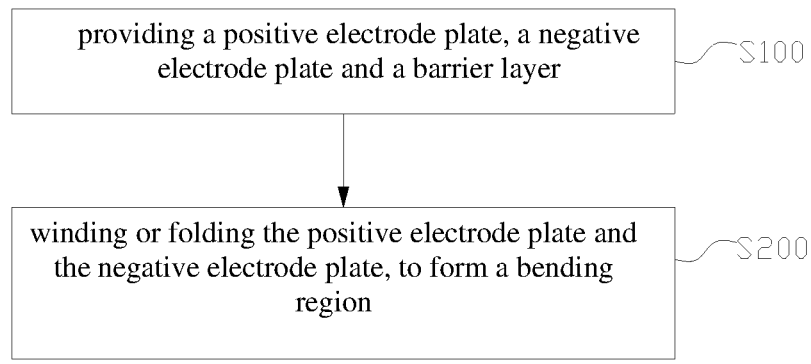
FIG. 13 is a flowchart of a manufacturing method for an electrode assembly provided by some embodiments of the present application.

Please refer to FIG. 13. FIG. 13 is a flowchart of a manufacturing method for an electrode assembly 22 provided by some embodiments of the present application. The manufacturing method for the electrode assembly 22 includes:

S100: providing a positive electrode plate 222, a negative electrode plate 221 and a barrier layer 223;

S200: winding or folding the positive electrode plate 222 and the negative electrode plate 221, to form a bending region A;

Among that, the positive electrode plate 222 includes a plurality of bending portions 2220 located in the bending region A, the bending portion 2220 includes a positive electrode current collecting layer 2220a and a positive active substance layer 2220b, and the positive electrode current collecting layer 22201 is provided with the positive active substance layer 2220b on at least one side surface in a thickness direction of the positive electrode plate 222.

At least one positive active substance layer 2220b is provided with the barrier layer 223, at least a part of the barrier layer 223 is intercalated in the positive active substance layer 2220b provided with the barrier layer 223, and coats at least a part of particles in the positive active substance layer 2220b, to prevent the particles from releasing an ion to the negative electrode plate 221.

Figure 14:
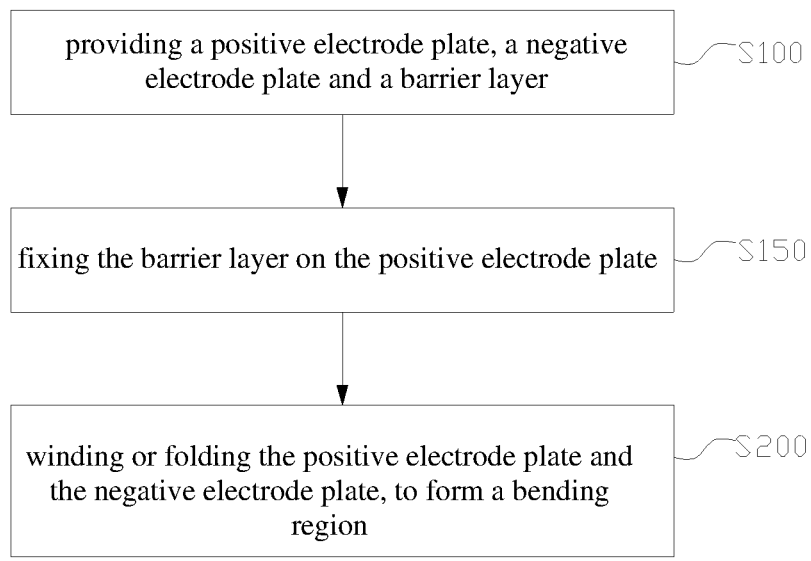
FIG. 14 is a flowchart of a manufacturing method for an electrode assembly provided by some other embodiments of the present application.

In some embodiments, please refer to FIG. 14. FIG. 14 is a flowchart of a manufacturing method for an electrode assembly 22 provided by some other embodiments of the present application. The manufacturing method for the electrode assembly 22 further includes:

S150: before the positive electrode plate 222 and the negative electrode plate 221 are wound or folded, fixing the barrier layer 223 on the positive electrode plate 222, so that at least a part of the barrier layer 223 is intercalated in the positive active substance layer 2220b of the positive electrode plate 222.

Taking the barrier layer 223 as an example of the glue layer, before the positive electrode plate 222 and the negative electrode plate 221 are wound or folded, the glue layer may be coated on the positive active substance layer 2220b of the positive electrode plate 222, so that the glue layer penetrates into the positive active substance layer 2220b from a gap between particles and particles; and then a part of the glue layer penetrating into the positive active substance layer 2220b coats at least a part of particles in the positive active substance layer 2220b, to prevent the particles from releasing ions. After the glue layer is solidified, the positive electrode plate 222 and the negative electrode plate 221 are then wound or folded.

Figure 15:
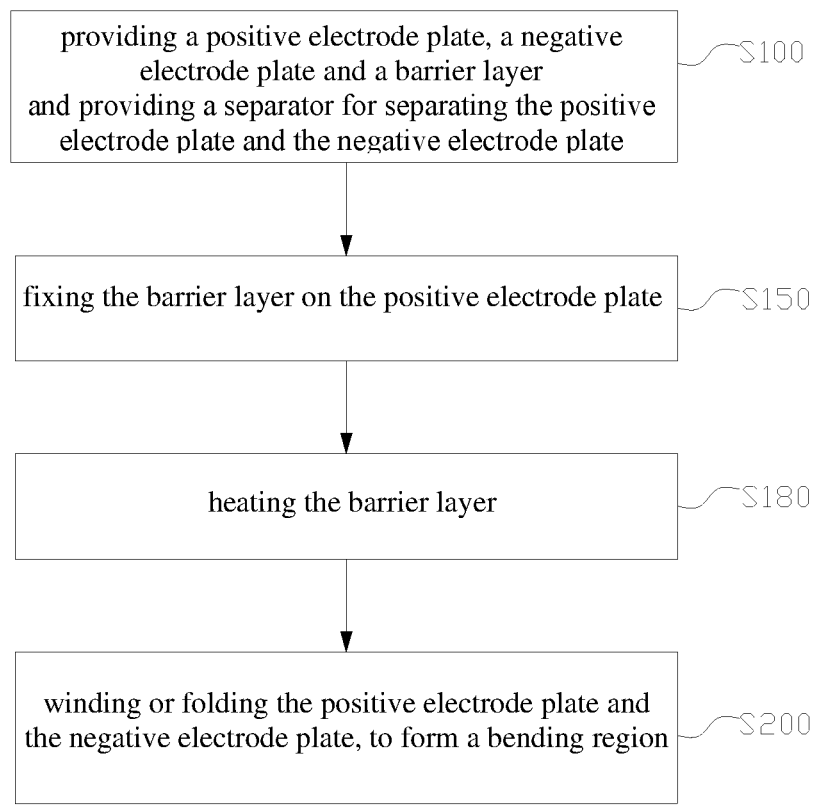
FIG. 15 is a flowchart of a manufacturing method for an electrode assembly provided by some other embodiments of the present application.

In some embodiments, please refer to FIG. 15. FIG. 15 is a flowchart of a manufacturing method for an electrode assembly 22 provided by some other embodiments of the present application, providing a separator 224 for separating the positive electrode plate 222 and the negative electrode plate 221, and winding or folding the positive electrode plate 222, the separator 224 and the negative electrode plate 221, to form the bending region A.

In some embodiments, the manufacturing method for the electrode assembly 22 further includes:

S180: heating the barrier layer 223, making the barrier layer 223 in a viscous state, so that the barrier layer 223 is bonded to the separator 224 and penetrates into a through hole 2241 of the separator 224.

Illustratively, the barrier layer 223 is a glue layer.

It should be noted that step S180 may be performed before step S200. For example, after the barrier layer 223 is fixed on the positive electrode plate 222, the positive electrode plate 222 and the separator 224 are stacked together; and then the barrier layer 223 is heated, to make the barrier layer 223 in a viscous state, so that the barrier layer 223 is bonded to the separator 224 and penetrates in the through hole 2241 of the separator 224; and then the negative electrode plate 221, the positive electrode plate 222 and the separator 224 are stacked together, and are wound or folded to form an electrode assembly 22 with a bending region A. Of course, step S180 may also be performed after step S200. For example, after the barrier layer 223 is fixed on the positive electrode plate 222, the positive electrode plate 222, the separator 224, and the negative electrode plate 221 are wound or folded, to form the electrode assembly 22 with the bending region A; and then the barrier layer 223 is heated, to make the barrier layer 223 in a viscous state, so that the barrier layer 223 is bonded to the separator 224 and penetrates into the through hole 2241 of the separator 224.

It should be noted that, for the related structure of the electrode assembly 22 manufactured by the above manufacturing method for the electrode assembly 22, please refer to the electrode assembly 22 provided in the above respective embodiment.

Figure 16:
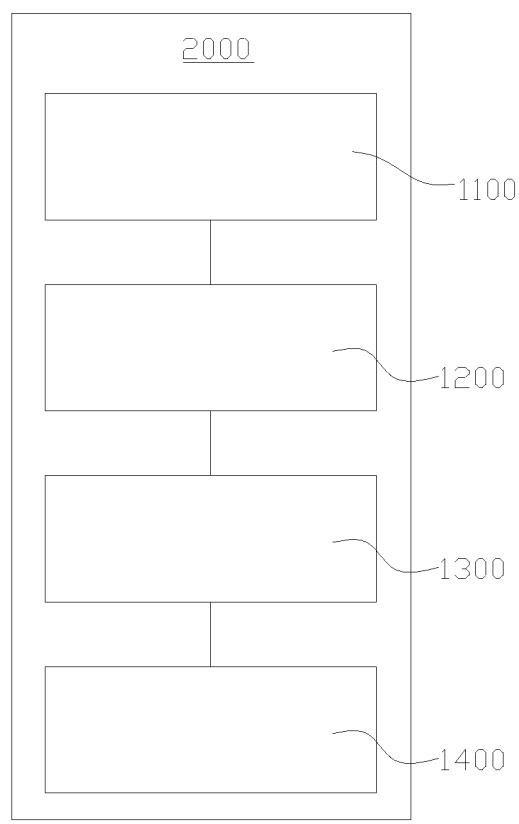
FIG. 16 is a schematic block diagram of a manufacturing device for an electrode assembly provided by some embodiments of the present application.

Please refer to FIG. 16. FIG. 16 is a schematic block diagram of a manufacturing device 2000 for an electrode assembly 22 provided by some embodiments of the present application. The manufacturing device 2000 includes a first providing apparatus 1100, a second providing apparatus 1200, a third providing apparatus 1300 and an assembly apparatus 1400.

The first providing apparatus 1100 is used for providing a positive electrode plate 222. The second providing apparatus 1200 is used for providing a negative electrode plate 221; and the third providing apparatus 1300 is used for providing the barrier layer 223. The assembly apparatus 1400 is used for winding or folding the positive electrode plate 222 and the negative electrode plate 221, to form a bending region A.

Among that, the positive electrode plate 222 includes a plurality of bending portions 2220 located in the bending region A, the bending portion 2220 includes a positive electrode current collecting layer 2220a and a positive active substance layer 2220b, and the positive electrode current collecting layer 22201 is provided with the positive active substance layer 2220b on at least one side surface in a thickness direction of the positive electrode plate 222.

At least one positive active substance layer 2220b is provided with the barrier layer 223, at least a part of the barrier layer 223 is intercalated in the positive active substance layer 2220b provided with the barrier layer 223, and coats at least a part of particles in the positive active substance layer 2220b, to prevent the particles from releasing an ion to the negative electrode plate 221.

In some embodiments, the assembly apparatus 1400 is further used for fixing the barrier layer 223 on the positive electrode plate 222, so that at least a part of the barrier layer 223 is intercalated in the positive active substance layer 2220b of the positive electrode plate 222.

Taking the barrier layer 223 as an example of the glue layer, the glue layer is coated on the positive active substance layer 2220b of the positive electrode plate 222 through the assembly apparatus 1400, so that the glue layer penetrates into the positive active substance layer 2220b; and then a part of the glue layer penetrating into the positive active substance layer 2220b coats at least a part of particles in the positive active substance layer 2220b, to prevent the particles from releasing ions. After the glue layer is solidified, then fixing of the barrier layer 223 to the positive electrode plate 222 is realized.

In some embodiments, the manufacture device 2000 further includes a fourth providing apparatus (not shown in the figure), the fourth providing apparatus used for providing the separator 224 that separates the positive electrode plate 222 from the negative electrode plate 221. The assembly apparatus 1400 is used for winding or folding the positive electrode plate 222, the separator 224 and the negative electrode plate 221, to form a bending region A.

In some embodiments, the assembly apparatus 1400 is further used for heating the barrier layer 223, making the barrier layer 223 in a viscous state, so that the barrier layer 223 is bonded to the separator 224 and penetrates into a through hole 2241 of the separator 224.

Illustratively, the barrier layer 223 is a glue layer.

It should be noted that for the related structure of the electrode assembly 22 manufactured by the above manufacturing device 2000, please refer to the electrode assembly 22 provided in the above respective embodiments.

In addition, the embodiments in the present application and features in the embodiments may be mutually combined provided that no conflict is caused.

The above embodiments are merely used to illustrate the technical solution of the present application, but are not intended to limit the present application. For those skilled in the art, the present application may have various amendments and modifications. Any modification, equivalent substitution, improvement etc, made within the spirit and principle of the present application shall fall within the protection scope of the present application.

What is claimed is:

1. An electrode assembly, comprising a negative electrode plate and a positive electrode plate, the negative electrode plate and the positive electrode plate forming a bending region by winding or folding;
   the positive electrode plate comprising a plurality of bending portions located in the bending region, the bending portion comprising a positive electrode current collecting layer and a positive active substance layer, and at least one side surface of the positive electrode current collecting layer being provided with the positive active substance layer in a thickness direction of the positive electrode plate;
   wherein, at least one positive active substance layer is provided with a barrier layer, at least a part of the barrier layer is intercalated in the positive active substance layer provided with the barrier layer, and coats at least a part of particles in the positive active substance layer, to prevent the particles from releasing an ion to the negative electrode plate;
   wherein the electrode assembly further comprises a separator for separating the positive electrode plate from the negative electrode plate; and the barrier layer is connected to the separator; and
   wherein the separator is provided with a plurality of through holes; and
   the barrier layer partially extends into the through hole and is connected to a hole wall of the through hole.

2. The electrode assembly according to claim 1, wherein the positive electrode current collecting layer is provided with the positive active substance layer on an inner side surface in the thickness direction; and the positive active substance layer located on the inner side surface of at least one bending portion is provided with the barrier layer.

3. The electrode assembly according to claim 1, wherein the positive electrode current collecting layer is provided with the positive active substance layer on an outer side surface in the thickness direction; and the positive active substance layer located on the outer side surface of at least one bending portion is provided with the barrier layer.

4. The electrode assembly according to claim 1, wherein the positive electrode current collecting layer is provided with the positive active substance layer on both the inner side surface and the outer side surface in the thickness direction, and the positive active substance layer located on the inner side surface and the positive active substance layer located on the outer side surface of at least one bending portion are both provided with the barrier layer.

5. The electrode assembly according to claim 1, wherein a depth of a part of the barrier layer extending into the through hole is no less than 3 micrometers.

6. The electrode assembly according to claim 1, wherein both ends of the barrier layer extending along a bending direction of the bending portion are located in the bending region.

7. The electrode assembly according to claim 1, wherein the electrode assembly comprises a straight region connected to the bending region;
both ends of the barrier layer extending along a bending direction of the bending portion are located in the straight region, or, one end of the barrier layer extending along the bending direction of the bending portion is located in the straight region, and the other end is located in the bending region.

8. The electrode assembly according to claim 1, wherein the barrier layer is a glue layer.

9. A battery cell, comprising a shell and the electrode assembly according to claim 1;
the electrode assembly being accommodated in the shell.

10. A battery, comprising a box body, and the battery cell according to claim 9;
the battery cell being accommodated in the box body.

11. A power consumption device, comprising the battery cell according to claim 9.

12. A manufacturing method for the electrode assembly of claim 1, the manufacturing method comprising:
providing a positive electrode plate, a negative electrode plate, a separator and a barrier layer;
winding or folding the positive electrode plate and the negative electrode plate, to form a bending region;
wherein, the positive electrode plate comprises a plurality of bending portions located in the bending region, the bending portion comprises a positive electrode current collecting layer and a positive active substance layer, at least one side surface of the positive electrode current collecting layer is provided with the positive active substance layer on in a thickness direction of the positive electrode plate;
at least one positive active substance layer is provided with the barrier layer, at least a part of the barrier layer is intercalated in the positive active substance layer provided with the barrier layer, and coats at least a part of particles in the positive active substance layer, to prevent the particles from releasing an ion to the negative electrode plate; and
the separator is configured to separate the positive electrode plate from the negative electrode plate; and the barrier layer is connected to the separator.

13. The manufacturing method according to claim 12, wherein the manufacturing method further comprises:
before winding or folding the positive electrode plate and the negative electrode plate, fixing the barrier layer on the positive electrode plate, so that at least a part of the barrier layer is intercalated in the positive active substance layer of the positive electrode plate.

14. The manufacturing method according to claim 12, wherein a separator for separating the positive electrode plate from the negative electrode plate is provided, and the positive electrode plate, the separator and the negative electrode plate are wound or folded to form the bending region.

15. The manufacturing method according to claim 14, wherein the manufacturing method further comprises:
heating the barrier layer, making the barrier layer in a viscous state, so that the barrier layer is bonded to the separator and infiltrated to a through hole of the separator.

16. An electrode assembly, comprising a negative electrode plate and a positive electrode plate, the negative electrode plate and the positive electrode plate forming a bending region by winding or folding;
the positive electrode plate comprising a plurality of bending portions located in the bending region, the bending portion comprising a positive electrode current collecting layer and a positive active substance layer, and at least one side surface of the positive electrode current collecting layer being provided with the positive active substance layer in a thickness direction of the positive electrode plate;
wherein, at least one positive active substance layer is provided with a barrier layer, at least a part of the barrier layer is intercalated in the positive active substance layer provided with the barrier layer, and coats at least a part of particles in the positive active substance layer, to prevent the particles from releasing an ion to the negative electrode plate;
wherein the electrode assembly further comprises a separator for separating the positive electrode plate from the negative electrode plate; and the barrier layer is connected to the separator; and
wherein the barrier layer comprises an intercalating portion and a connection portion;
the intercalating portion is intercalated in the positive active substance layer provided with the barrier layer, the connection portion is connected to the separator, and the connection portion is located between the separator and the positive active substance layer provided with the barrier layer.

17. The electrode assembly according to claim 16, wherein a thickness of the connection portion is no more than 20 micrometers.

18. A battery cell, comprising a shell and the electrode assembly according to claim 16;
the electrode assembly being accommodated in the shell.

19. An electrode assembly, comprising a negative electrode plate and a positive electrode plate, the negative electrode plate and the positive electrode plate forming a bending region by winding or folding;
the positive electrode plate comprising a plurality of bending portions located in the bending region, the bending portion comprising a positive electrode current collecting layer and a positive active substance layer, and at least one side surface of the positive electrode current collecting layer being provided with the positive active substance layer in a thickness direction of the positive electrode plate;
wherein, at least one positive active substance layer is provided with a barrier layer, at least a part of the barrier layer is intercalated in the positive active substance layer provided with the barrier layer, and coats at least a part of particles in the positive active substance layer, to prevent the particles from releasing an ion to the negative electrode plate; and wherein the positive electrode plate and the negative electrode plate form a winding structure by winding, and the winding structure comprises the bending region;

an electrode plate of the innermost side of the bending region is the negative electrode plate, and a bending portion of the innermost side of the bending region is provided with the barrier layer.

20. A battery cell, comprising a shell and the electrode assembly according to claim 19;
the electrode assembly being accommodated in the shell.

* * * * *